United States Patent [19]

Goron

[11] 4,297,092

[45] Oct. 27, 1981

[54] ACCUMULATOR HEAD USED IN THE FORMATION OF A MULTI-LAYER PARISON

[75] Inventor: John Goron, Bridgewater, N.J.

[73] Assignee: Midland-Ross Corporation, Cleveland, Ohio

[21] Appl. No.: 164,787

[22] Filed: Jun. 30, 1980

[51] Int. Cl.³ .............. B29D 23/03; B29D 23/04; B29C 17/07

[52] U.S. Cl. .................. 425/133.1; 264/514; 264/540; 425/532; 425/380; 425/462; 425/467

[58] Field of Search ............ 425/133.1, 532, 462, 425/380, 467; 264/514, 523, 540

[56] References Cited

U.S. PATENT DOCUMENTS

| | | | |
|---|---|---|---|
| 3,023,461 | 3/1962 | Sherman | 425/532 X |
| 3,453,690 | 7/1969 | Mayner | |
| 3,972,664 | 8/1976 | Pilmann | 425/133.1 X |
| 4,120,633 | 10/1978 | Feuerherm | 425/462 X |
| 4,149,839 | 4/1979 | Iwawaki et al. | 425/532 X |
| 4,152,104 | 5/1979 | Przytulla et al. | 425/133.1 X |
| 4,165,212 | 8/1979 | Ziegler | 425/532 X |
| 4,179,251 | 12/1979 | Hess et al. | 425/532 X |
| 4,208,178 | 6/1980 | Przytulla | 425/462 X |

Primary Examiner—Philip Anderson
Attorney, Agent, or Firm—Harlan E. Hummer

[57] ABSTRACT

An accumulator head is described as having an annular accumulation chamber, an annular ring-piston movable axially in the chamber for forcing resinous material from the chamber through an annular discharge passageway leading from the chamber to an annular discharge orifice which, for example, is in communication with a blow mold. An annular inlet is provided in the discharge passageway between the chamber and orifice as a means whereby resinous material is moved into the discharge passageway to add an outer laminate to material flowing through the discharge passageway, or as a means of filling the accumulation chamber with a slug of material.

15 Claims, 2 Drawing Figures

4,297,092

ACCUMULATOR HEAD USED IN THE FORMATION OF A MULTI-LAYER PARISON

BACKGROUND OF THE INVENTION

The invention is particularly well suited for use in a ring-piston accumulator method of forming a multi-layer parison which is utilized in the production of, for example, automotive fuel tanks and other containers which are desirably produced from laminates of dissimilar materials, e.g. an outer wall composed of a high molecular weight polyethylene and an inner wall composed of a barrier-type resin, such as polyamide.

U.S. Pat. No. 2,710,987 is typical of the many patents relating to the continuous extrusion of plastic articles of different laminates. U.S. Pat. No. 3,266,093 discloses the use of an inlet relatively near the discharge outlet of a continuous extrusion device, as a means of adding an outer laminate to the material being extruded. However, the devices of these patents do not utilize a ring-piston to force the resinous material from an accumulation chamber into an adjacent mold. It can be appreciated from a study of these patents that the different resinous materials are thermally separated until just prior to their movement into a mold in which the article is formed. U.S. Pat. No. 4,120,633 is directed to an extrusion device which employs an accumulation chamber and ring piston in the production of a multi-layer parison. In this device, however, the laminates of plastic material are all forced into the accumulation from inlets which are located above the accumulation chamber. The invention is directed to a ring piston-type extrusion device, wherein at least one of the inlets for a laminate is located, so that the laminate flowing therethrough into the device will not contribute to the forces which cause movement of the ring-piston to a retracted position out of the accumulation chamber, to insure that the laminate will be uneffected and not distorted in any way be such forces, as may be the case when several laminates combine to exert force against the ring piston to move it to its retracted position above the accumulation chamber.

Briefly stated, the invention is in an apparatus for forming a multi-layer parison of different resinous materials. The apparatus comprises an annular accumulation chamber which is designed to receive and hold at least one of the two different resinous materials. The chamber has a longitudinal axis which is, normally, vertically disposed when the apparatus is in operation and which is spaced from an annular discharge orifice through which the extrudite exits the apparatus into an adjacent mold. The orifices and chamber are connected by a discharge passageway. A special annular opening is provided in the discharge passageway vertically below the chamber. Means are provided for moving into the chamber, under pressure, one of the different resinous materials until the chamber is filled to a desired level. A single, annular ring-piston or ram is disposed in the chamber and movable axially thereof to force this resinous material from the chamber through the discharge passageway and orifice into an adjacent mold in which the parison and resulting product are formed. Means are supplied for forcing the other of the different resinous materials through the entrance opening into the discharge passageway at the same time as the first resinous material is being forced from the chamber to produce within the discharge passageway at least two laminates of different resinous materials for subsequent passage through the orifice into a mold which is connected to the orifice.

Another feature of the invention is the utilization of the entrance opening in the discharge passageway as the sole inlet through which resinous material is forced into the accumulation chamber for subsequent discharge through the discharge passageway and orifice as a single laminate or layer of material.

DESCRIPTION OF THE DRAWING

The following description of the invention will be better understood by having reference to the accompanying drawing, wherein.

ENVIRONMENT OF THE INVENTION

Figure 1:
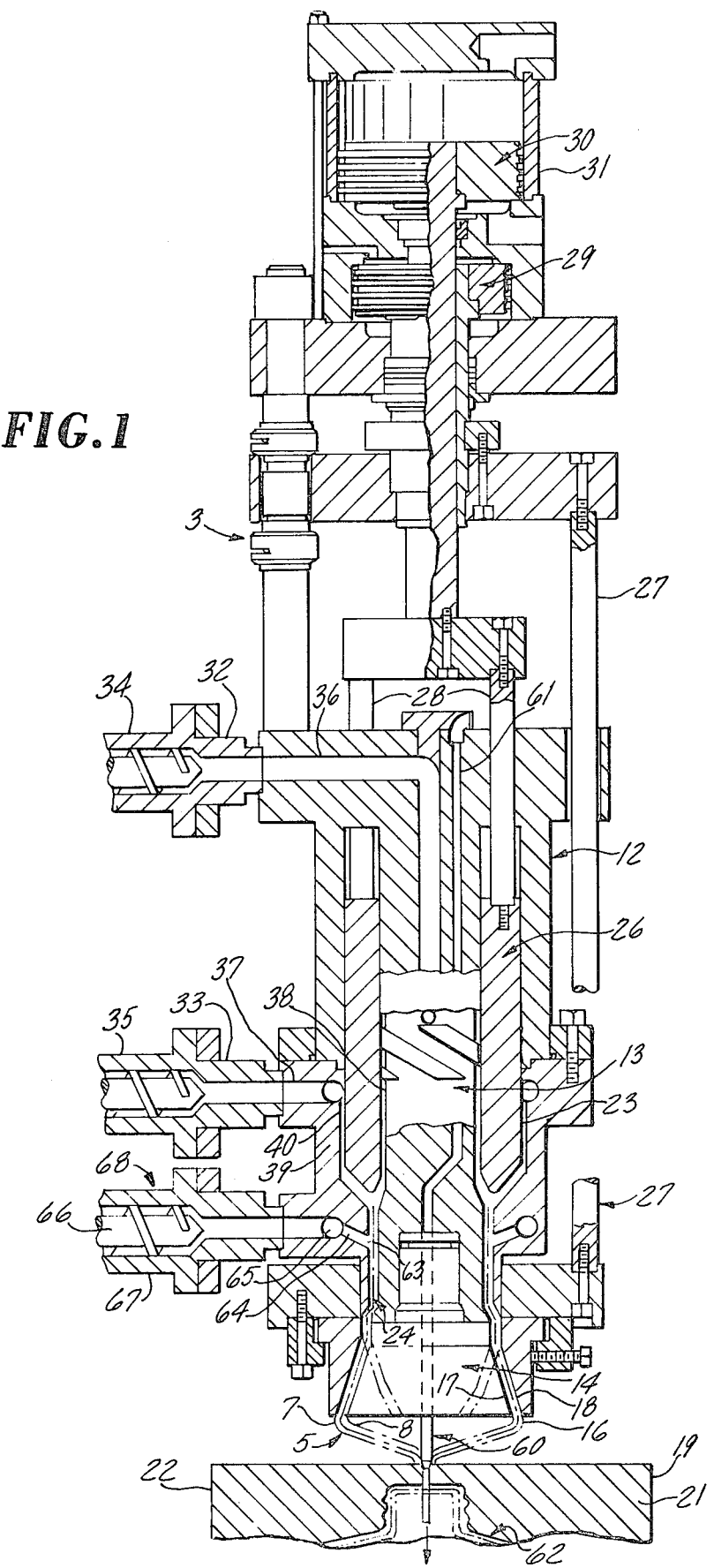
FIG. 1 is a vertical section of an apparatus which is made in accordance with the invention and designed to form a parison of not more than three layers of dissimilar materials.
Figure 2:
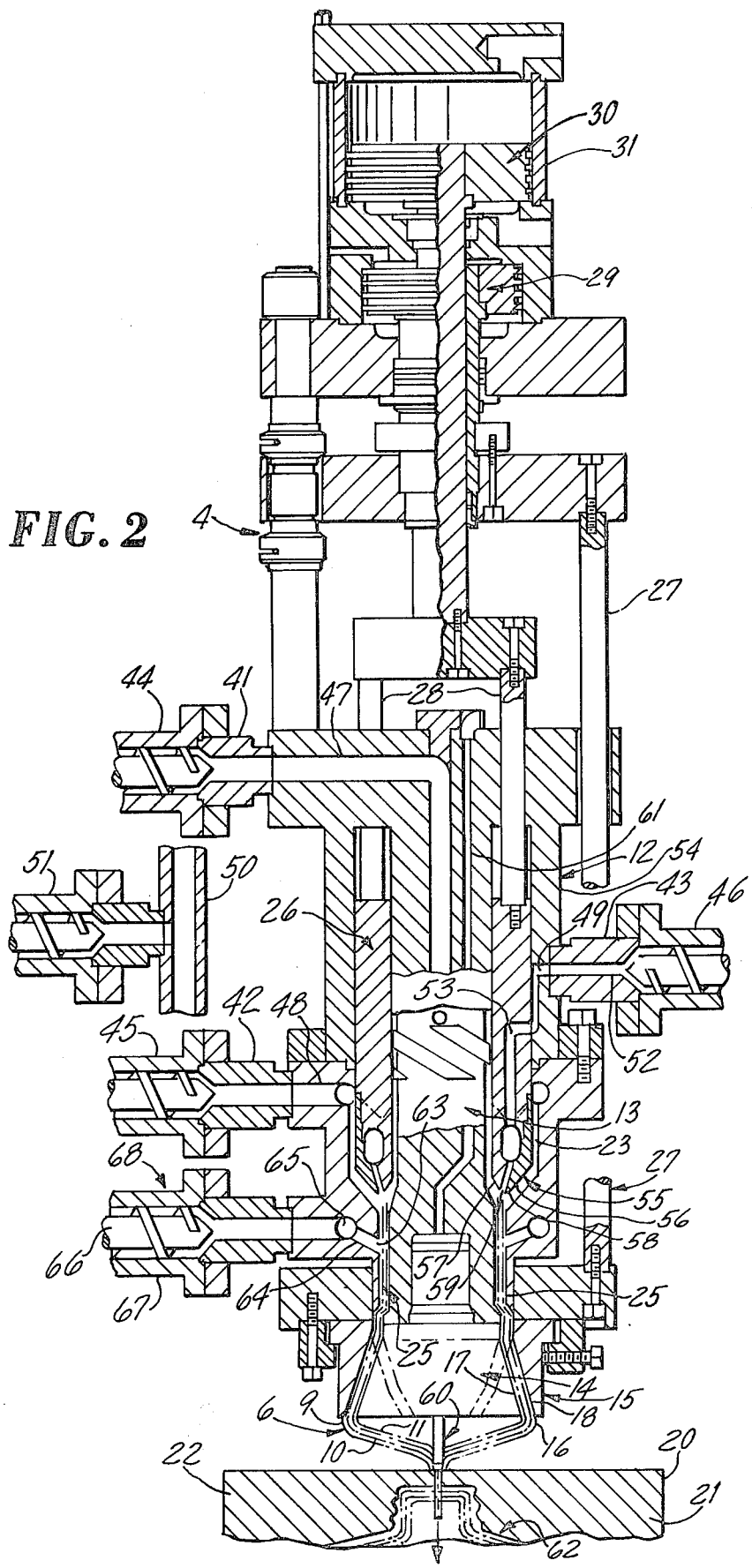
FIG. 2 is a vertical section of a similar apparatus which is made in accordance with the invention and designed to form a parison of three or more layers of dissimilar materials.

With reference to FIGS. 1 and 2, there are shown two apparatuses 3,4 which are used in the production of a pair of multi-layered parisons 5,6 that are formed of two and three layers 7,8 and 9,10,11, respectively, of different synthetic resinous materials, such as ethylene vinyl acetate, low-density polyethylene, high density polyethylene, polypropylene, polytrephthalate, and nylon.

The apparatuses 3,4 are each comprised of similar, essential components of an accumulator head or die body 12, a mandrel 13 fixedly disposed within the accumulator head 12 and extending centrally and longitudinally thereof, a frusto-conically shaped die pin 14 abuttingly aligned with the mandrel 13, and a nozzle or die ring 15 with a matingly tapered bore surrounding the die pin 14 and movable longitudinally thereof to adjust the size of a circular orifice 16 formed therebetween.

The die pins and rings 14,15 have matingly sloped outer and inner sidewalls 17,18 which diverge or converge (note dotted lines) in a direction away from the mandrels 13, depending on the size of the parisons being formed. In this instance, the sidewalls 17,18 of the die pins and rings 14,15 diverge from each other in a direction away from the mandrels 13 towards adjacently positioned molds 19,20 which are each formed of two mold halves 21,22 that are movable towards and away from each other. The size and shape of the orifices 16 are dependent on the size and shape of the die pins and rings 14,15. The die rings 15 are fully extended or moved in a direction away from the mandrels 13 to block or close the orifices 16, as more thoroughly described in U.S. Pat. No. 3,453,690.

The apparatuses 3,4 are each further provided with a single annular chamber 23 which acts as a common receptacle in which the different resinous materials are accumulated, prior to passage through the orifices 16 into the molds 19,20. The accumulation chambers 23 extend longitudinally within the accumulator heads 12 and are concentrically disposed around the longitudinal axes thereof. A pair of generally annular discharge passageways 24,25 connect the orifices 16 and accumulation chambers 23.

A single, annular ring-piston or ram 26 is disposed within each of the accumulation chambers 23 and is reciprocable axially therein between a fully retracted position, shown in dotted line, and a fully extended position, shown in full line, to force the generally cylindrical concentric layers or laminates of different resinous materials from the accumulation chambers 23 downwardly through the discharge passageways 24,25 and out the orifices 16 into the adjacent molds 19,20. The die ring 15 and ring-piston 26 of each of the apparatuses 3,4, are coupled by actuator rods 27,28 to a pair of reciprocating pistons 29,30 of a dual or twin hydraulic cylinder 31 which is mounted atop each of the accumulator heads 12 and used in the selective operation of the die rings 15 and ring-pistons 26.

With particular reference to FIG. 1, the accumulator head 12 of apparatus 3 is provided with a pair of spaced adapters 32,33 for mounting a set of two extruders 34,35 which are used to extrude different resinous materials into a pair of inlet passageways 36,37 which connect the extruders 34,35 with the accumulation chamber 23. The inlet passageway 36 leading from the first, vertically uppermost extruder 34, extends downwardly through the mandrel 13, to an annular opening in the inner periphery 38 of the accumulation chamber 23 closest the longitudinal centerline of the mandrel 13. The inlet passageway 37 leading from the second, vertically lowermost extruder 35 extends through the outer sidewall 39 of the accumulator head 12 to an annular opening in the outer periphery 40 of the accumulation chamber 23 farthest from the longitudinal axis of the mandrel 13. In this manner, the different resinous materials from the extruders 34,35 are forced into the accumulation chamber 23 as longitudinally expanding cylindrical layers or laminates until the accumulation chamber 23 is filled with sufficient resinous materials to form the parison 5. The laminates are concentrically disposed one within the other in the accumulation chamber 23.

With particular reference to FIG. 2, the accumulator head 12 is provided with three spaced adapters 41,42,43 for mounting a set of three extruders 44,45,46 which are used to extrude different resinous materials into three separate passageways 47,48,49 which connect the extruders 44,45,46 with separated annular openings in the accumulation chamber 23 whereby three different resinous materials are extruded into the accumulation chamber 23 as longitudinally expanding cylindrical layers or laminates until the accumulation chamber 23 is filled with the desired amount of material. Optionally, the two vertically aligned adapters 41,42 at one side of the accumulator head 12 can be coupled by a manifold 50 to a single extruder 51 in cases where it is desirous to form, for example, the innermost and outermost laminates of the same resinous material.

It can be appreciated from a comparison of FIGS. 1 and 2 that the accumulator heads 12 of the two apparatuses 3,4 are essentially the same, except for the third extruder 46 and its adaption to the accumulator head 12. The third inlet passageway 49 leading from the third extruder 46 to the accumulation chamber 23 is via the ring-piston 26. To accomplish this, the third inlet passageway 49 is essentially formed of two segments 52,53, the first segment 52 being in the outer sidewall 54 of the accumulator head 12 and the second segment 53 being in the ring-piston 26.

The ring-pistons 26, especially the one used in the formation of the three-layered parison 9, each have a tapering free distal end 55 formed by two sloping sides 56,57 which converge in the direction of the die pin 14 and form a peak or ridge 58 therebetween. The second segment 53 of the third inlet passageway 49 extends to a circular opening 59 in the ridge 58 of each ring-piston 26, so that the third layer or stream of extruded resinous material from the third extruder 46 via the ring-piston 26, is between the inner and outer layers or streams of resinous materials from the other two extruders 44,45. In this way, the adjacent laminates are of different resinous materials. The ring pistons 26 can be provided with other passageways, if necessary, to accommodate a fourth extruder, if it is desirous to produce a parison of four laminates.

The operation of the apparatuses 3,4 of FIGS. 1 and 2 are essentially the same. Therefore, the following description of their operation will be in relation to the apparatus 3 of FIG. 1. Assuming the die ring 15 is fully extended adjacent the die pin 14 to block or close the orifice 16, and the ring-piston 26 is fully extended within the accumulation chamber 23, the extruders 34,35 are operated to extrude the different resinous materials, under pressure, into the accumulation chamber 23 as a pair of concentric laminates 7,8, which force the ring-piston 26 to a retracted position where the accumulation chamber 23 is filled with the desired amount of material to form the parison 5. The die ring 15 is retracted from the die pin 14 to open the orifice 16. The ring-piston 26 is then operated to force the different concentric laminates 7,8 downwardly through the discharge passageway 24 and out through the orifice 16 into the open mold 19 where the tubular parison 5 is formed. The mold 19 is closed around, for example, a blow pin 60 which extends from the die pin 14, by bringing the mold halves 21,22 together to pinch-off opposing ends of the parison 5 with the blow pin 60 therein. The die ring 15 is moved to close the orifice 16. Air is pumped by any suitable means, under pressure, through an air line 61 which is in the mandrel 13 and connected to the blow pin 60, to expand the parison 5 within the mold and blow mold the final part or product 62. The mold 19 is subsequently opened to remove the product 62, after which the operation is repeated to form another parison and part. The air used in the blow molding process can be alternately circulated into the parison 5 through the bottom of the mold 19, rather than through the top, if desired.

It can be appreciated from the drawing and description, that in two of the above instances, the ring-piston 26 forms one of the walls of the annular inlet passageway through which extrudite flows from the extruder into the accumulation chamber 23, the mandrel 13 and outer sidewall 39 of the accumulation chamber 23 or head 12 forming the other wall of the inlet passageway. In some cases, a cylindrical sleeve is positioned around the mandrel 13 to form with the mandrel, an annular inlet passageway having an exit opening near the bottom of the accumulation chamber through which extrudite enters the accumulation chamber 23 to force the ring-piston 26 to its retracted position.

THE INVENTION

A separate, annular entrance opening 63, as seen in FIGS. 1 and 2, is provided in the discharge passageways 24,25 between the accumulation chambers 23 and the discharge orifices 16 of the apparatuses 3,4 as a means of adding a final, outer layer or laminate of resinous material which is generally different from that being forced from the accumulation chambers 23 by the ring-pistons 26. It should be appreciated that the annular entrance opening 63 can be used as the sole inlet through which resinous material is forced into the accumulation chambers 23 of the apparatuses 3,4, when, for example, it is desirous to form an unlaminated parison of the same material. The entrance opening 63 can also be used in combination with any one of the aforementioned extruders 34,35,44,45,51 in the formation of a multiple layer parison, depending on the desired composition of the final product 62. In the latter cases, the entrance opening 63 is used to add a final, outer layer of resinous material to that leaving the accumulation chambers 23 of the extrusion apparatuses 3,4. Each of the entrance openings 63 opens into an annular entrance passageway 64 which is conically oriented or inclined in relation to the longitudinal axes of the apparatuses 3,4, such that each of the generally parallel walls of each entrance passageway 64 converge in the direction of the discharge orifice 16. The annular entrance passageways 64 are sufficiently long to form the resinous material into a smooth, converging, cylindrical tube for uniform entry into the discharge passageways 24,25 for assimilation as an outer laminate with the other resinous material flowing through the discharge passageways 24,25 from the accumulation chambers 23. The entrance passageways 64, like the inlet passageways 37,48 of the apparatuses 3,4, are each in communication with an enlarged annular compartment 65 and any suitable means, such as a continuously operating screw within an extruder or a reciprocating plunger, or preferably, as shown, a rotatable and reciprocable screw 66 within the barrel 67 of an extruder 68, for forcing resinous material into the compartment 65 for subsequent dispatch through the entrance passageway 64 and opening 63. The entrance opening 63 and passageway 64 of each of the apparatuses 3,4, for convenience in mounting the extruder 68, are located in stationary portions of the apparatuses 3,4, rather than in the outer movable rings 15 which are used to adjust the size of the discharge orifices 16. The operation of the ring-pistons 26 and the extruders 68 which are coupled to the entrance openings 63, are synchronized, so that the extruders 68 will force resinous material into the discharge passageways 24,25 as the ring-pistons 26 correspondingly force resinous material from the accumulation chambers 23 into the discharge passageways 24,25. In this way, a parison 5 can be made to have two or more layers, wherein alternate layers are composed of different resinous materials.

Thus, there has been described a unique apparatus which has a single ring-piston for forcibly ejecting one or a plurality of substantially cylindrical laminates of resinous material from a common chamber in which the laminates are accumulated by extrusion from one or a plurality of extruders. The laminates in the common chamber, are joined by a final, outer layer or laminate of resinous material as they are forced through a common annular discharge passageway leading from the chamber.

What is claimed is:

1. An apparatus used in the formation of an article composed of resinous material, comprising:
   (a) at least one annular accumulation chamber for receiving and holding resinous material, the chamber having a longitudinal axis;
   (b) an annular discharge orifice spaced from the chamber;
   (c) an annular discharge passageway connecting the orifice and chamber, the portion of the passageway leading from the chamber being cylindrical about a longitudinal axis which coincides with the longitudinal axis of the chamber;
   (d) an annular ring-piston disposed in the chamber and movable axially thereof, to force resinous material from the chamber through the discharge passageway and orifice;
   (e) an annular compartment with a circular cross-section surrounding the cylindrical portion of the discharge passageway;
   (f) an annular entrance opening in the cylindrical portion of the passageway between the chamber and orifice;
   (g) an annular entrance passageway connecting the compartment and entrance opening, the entrance passageway converging in the direction of the discharge orifice; and
   (h) means communicating with the compartment for moving resinous material into the compartment and through the entrance passageway and opening into the discharge passageway.

2. The apparatus of claim 1, wherein the moving means (h) includes:
   an annular entrance passageway leading from the entrance opening and terminating at an enlarged annular compartment, the entrance passageway having generally parallel walls which converge in the direction of the discharge orifice; and
   an extruder communicating with the compartment for extruding resinous material thereto for subsequent dispatch through the entrance passageway and opening.

3. The apparatus of claim 1, which includes:
   (i) a ring for adjusting the size of the discharge opening; and
   (j) means mounting the ring in further spaced relation from the chamber than the entrance opening and for movement to and from the chamber.

4. The apparatus of claim 1, which includes means for moving resinous material into the chamber, including:
   (i) at least one annular fluid passageway communicating with the chamber in spaced relation from the discharge passageway; and
   (j) an extruder associated with the fluid passageway for extruding resinous material through the fluid passageway into the chamber.

5. The apparatus of claim 1, which includes means for moving resinous material into the chamber, including:
   (i) a fluid passageway disposed in the ring-piston and communicating with the chamber;
   (j) a separate fluid passageway communicating with the chamber in spaced relation from the discharge passageway and the fluid passageway in the ring-piston; and
   (k) an extruder associated with each of the fluid passageways for extruding resinous materials through the fluid passageways into the chamber.

6. The apparatus of claim 1, 4 or 5 wherein the means (f) communicating with the entrance opening includes means for forcing resinous material through the entrance opening into the discharge passageway in synchronized relation with movement of the ring-piston to force resinous material from the chamber.

7. An apparatus used in the formation of an article composed of a plurality of layers of different resinous materials, comprising:
   (a) at least one annular accumulation chamber for receiving and holding resinous material, the chamber having a longitudinal axis;

(b) means for moving into the chamber, under pressure, at least one resinous material to fill at least a portion of the chamber with a desired amount of material;

(c) an annular ring-piston disposed in the chamber and movable axially thereof, to force resinous material from the chamber;

(d) an annular discharge orifice spaced from the chamber;

(e) an annular discharge passageway connecting the orifice and chamber, the portion of the passageway leading from the chamber being cylindrical about a longitudinal axis which coincides with the longitudinal axis of the chamber;

(f) an annular entrance opening in the cylindrical portion of the passageway between the chamber and orifice, the entrance opening surrounding the passageway;

(g) an annular entrance passageway leading from the entrance opening and terminating at an enlarged annular compartment which surrounds the cylindrical portion of the discharge passageway, the entrance passageway having generally parallel walls which converge in the direction of the discharge orifice, the entrance passageway being sufficiently long to form the resinous material therein into a tapering hollow tube for assimilation with resinous material, flowing in the passageway past the opening, as an outer layer; and (h) means coacting with the compartment for forcing resinous material into the compartment and through the entrance passageway and opening into the discharge passageway in synchronized relation with movement of the ring-piston to force resinous material from the chamber.

8. The apparatus of claim 7, wherein the means for forcing resinous material into the compartment includes:

(i) an extruder communicating with the compartment for extruding resinous material thereto for subsequent dispatch through the entrance passageway and opening.

9. An apparatus used in the formation of an article composed of a plurality of layers of different resinous materials, comprising:

(a) an accumulator head including a common annular chamber for receiving and accumulating different resinous materials;

(b) a plurality of inlet passageways leading from the accumulation chamber and having separated annular openings in said chamber;

(c) an extruder communicating with each of the plurality of inlet passageways for extruding different resinous materials into the common accumulation chamber;

(d) an annular discharge orifice spaced from the accumulation chamber and formed of a continuous slot having a desired configuration;

(e) an annular discharge passageway connecting the orifice and accumulation chamber and having an inner wall in spaced relation from an outer wall, the inner wall being closer the longitudinal axis of the accumulator head than the outer wall, the walls extending in cylindrical relation from the chamber;

(f) means for varying the width of the slot and consequent size of the orifice;

(g) a single, annular ring-piston in the accumulation chamber and movable axially thereof to force resinous material from the accumulation chamber through the discharge passageway and orifice;

(h) an annular entrance opening disposed in the outer cylindrical wall of the discharge passageway between the chamber and orifice;

(i) an annular entrance passageway leading from the opening and terminating at an annular compartment which surrounds the outer cylindrical wall of the discharge passageway, the entrance passageway having substantially parallel walls which converge in the direction of the orifice; and (j) means communicating with the compartment for forcing resinous material thereto in synchronized relation with movement of the piston to force resinous material from the chamber, to dispatch resinous material into the entrance passageway for subsequent movement through the opening into the discharge passageway.

10. The apparatus of claim 9, wherein the accumulation chamber has a pair of spaced inner and outer cylindrical peripheries, and two of the inlet passageways leading from the accumulation chamber communicate with annular openings in said inner and outer peripheries.

11. The apparatus of claim 10, which includes a mandrel extending longitudinally and centrally of the accumulator head, the mandrel forming the inner cylindrical periphery of the chamber.

12. The apparatus of claim 11, wherein the means for varying the size of the orifice includes a die pin having a frustoconical shape, and a movable die ring with a tapered bore surrounding the die pin and which cooperates with the die pin to form the orifice, and means for reciprocating the die ring longitudinally of the die pin.

13. The apparatus of claim 12, wherein the ring-piston includes a free distal end, closest the accumulation chamber, with converging sidewalls that form therebetween a ridge which extends into the accumulation chamber, and a circular opening disposed in the ridge and communicating with an inlet passageway in the ring-piston.

14. The apparatus of claim 13, which includes a manifold connecting the two inlet passageways communicating with the inner and outer peripheries of the accumulation chamber, and a single extruder coupled to the manifold for extruding the same resinous material into the inlet passageways.

15. The apparatus of claim 9, 12, or 14, wherein the means (j) for forcing resinous material to the compartment includes (I) a screw rotatable within the barrel of an extruder, and (II) means for reciprocating the screw longitudinally of the barrel as the screw rotates.

* * * * *